(12) United States Patent
Mouyal (10) Patent No.: US 10,336,122 B2
(45) Date of Patent: Jul. 2, 2019

(54) SYSTEM AND PROCESS FOR MANUFACTURING ANIMATED PAPERS USING DIGITAL PRINTING

(71) Applicant: Mordeckai Mouyal, Kfar Shmaryahoo (IL)

(72) Inventor: Mordeckai Mouyal, Kfar Shmaryahoo (IL)

( * ) Notice: Subject to any disclaimer, the term of this patent is extended or adjusted under 35 U.S.C. 154(b) by 0 days.

(21) Appl. No.: 15/503,402

(22) PCT Filed: Jul. 13, 2016

(86) PCT No.: PCT/IL2016/050757
§ 371 (c)(1),
(2) Date: Feb. 13, 2017

(87) PCT Pub. No.: WO2017/009835
PCT Pub. Date: Jan. 19, 2017

(65) Prior Publication Data
US 2018/0111404 A1    Apr. 26, 2018

(30) Foreign Application Priority Data

Jul. 14, 2015 (IL) .......................................... 239936

(51) Int. Cl.
*G09F 11/00* (2006.01)
*B42D 15/04* (2006.01)
(Continued)

(52) U.S. Cl.
CPC .......... *B42D 15/045* (2013.01); *B31D 5/0043* (2013.01); *B42D 15/042* (2013.01);
(Continued)

(58) Field of Classification Search
CPC .......... G09F 11/00; G09F 11/025; G09F 7/00; G09F 7/10; G09F 1/04; A63B 71/0672;
(Continued)

(56) References Cited

U.S. PATENT DOCUMENTS 639,679 A * 12/1899 Kaufmann .............. G09F 11/00
40/488
718,305 A * 1/1903 Blanchard .............. G09F 11/00
273/155
(Continued)

FOREIGN PATENT DOCUMENTS

DE    202015001842    3/2015
GB    191107624      3/1912

*Primary Examiner* — Cassandra Davis (57) ABSTRACT

Innovative animated paper (100) that includes fold lines (300) each of which consists of two or more parallel fold grooves (301). The bottom (302) each fold groove (301) is narrow compared with its upper part (303). In addition, a system and process for the manufacture of animated papers products using digital printing, which includes the following components and stages: software that offers a selection of three-dimensional paper product models. The software enables the user to choose a specific model from the selection of models, to design graphics for the selected model, and to send the graphic design to the printing house as a ready-for-print file. The printing house maintains a stock of pre-prepared paper for these models, which has already undergone processes of cutting. The printing house then receives the ready-for-print file from the software and prints the graphics on the relevant pre-prepared paper for the selected model.

1 Claim, 12 Drawing Sheets

(51) Int. Cl.
B31D 5/00 (2017.01)
G06T 13/00 (2011.01)
B31F 1/08 (2006.01)

(52) U.S. Cl.
CPC .............. G06T 13/00 (2013.01); B31F 1/08 (2013.01); *G06T 2213/08* (2013.01); *G09F 11/00* (2013.01)

(58) Field of Classification Search
CPC .. B42D 15/045; B42D 15/042; B31D 5/0043; G06T 13/00; G06T 2213/08; B31F 1/08
See application file for complete search history.

(56) References Cited

U.S. PATENT DOCUMENTS

| | | | | |
|---|---|---|---|---|
| 1,658,968 A | * | 2/1928 | Carroll | G09F 1/00 40/488 |
| 2,485,806 A | * | 10/1949 | Berg | B44F 1/10 40/488 |
| 2,884,724 A | | 5/1959 | Lohnes et al. | |
| 3,403,465 A | * | 10/1968 | Lane | G09F 11/23 40/491 |
| 3,659,367 A | * | 5/1972 | Yumoto | G09F 19/00 40/491 |
| 4,087,929 A | * | 5/1978 | Ruger | G09F 1/10 40/488 |
| 4,809,453 A | * | 3/1989 | Morgan | G09F 1/04 40/488 |
| 4,913,694 A | * | 4/1990 | Alphenaar | G09F 11/00 283/65 |
| 7,056,122 B2 | * | 6/2006 | Lockett | G09B 1/00 116/240 |
| 7,883,755 B2 | | 2/2011 | Lemberger | |
| 7,918,043 B2 | * | 4/2011 | Clegg | B42D 15/045 40/124 |
| 2002/0095835 A1 | * | 7/2002 | Vanderburg | G09F 1/00 40/491 |
| 2006/0236573 A1 | * | 10/2006 | Bognar | G09F 11/00 40/488 |
| 2009/0007469 A1 | * | 1/2009 | Kamimoto | G09F 11/00 40/124.191 |
| 2010/0216619 A1 | | 8/2010 | Powell | |
| 2014/0069994 A1 | | 3/2014 | Carroll | |

* cited by examiner

SYSTEM AND PROCESS FOR MANUFACTURING ANIMATED PAPERS USING DIGITAL PRINTING

RELATED APPLICATIONS

This application is a National Phase of PCT Patent Application No. PCT/IL2016/050757 having International filing date of 13 Jul. 2016, which claims the benefit of priority of IL Patent Application No. 239936 filed on 14 Jul. 2015. The contents of the above applications are all incorporated by reference as if fully set forth herein in their entirety.

TECHNICAL FIELD

The present invention refers to a system and process for the manufacture of animated paper using digital printing.

BACKGROUND ART

Many companies and various entities use folding, extractable or three-dimensional paper products to display pictures or graphic contents as part of advertising campaigns, marketing, and sales promotion activities. Over the years, a demand has arisen for such paper products with interesting and intricate designs. The present patent application refers to and describes an apparatus for displaying graphic contents that has an innovative and interesting design which is combined with additional advantageous as discloses hereinafter and in the application.

It is customary to produce and manufacture paper products in a variety of shapes and designs for purposes of advertising, marketing, sales promotion, and so on. Such paper products include books, pamphlets, greeting cards, event invitations, and so on and are made of cut and/or folded paper. They are designed so as to create special effects and various animations that form when the product is opened or activated. In other words, opening or activating the product creates an effect of shifting, jumping, rotation, or movement in parts of the product.

Products of this kind will be referred to here as "animated papers". Animated papers are manufactured from paper that has undergone a process of cutting or perforation (hereinafter referred to as "cutting") and sometimes also folding. The term "paper" in the aforementioned context refers to any kind of paper, of any thickness, including cardboard and so on.

Figure 2:
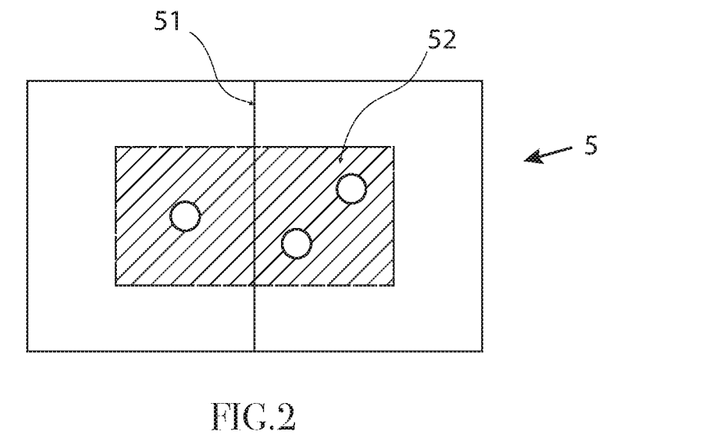
FIG. 2 depicts a piece of standard animated paper (5) with a fold line (51) and a print (52).
Figure 3A:
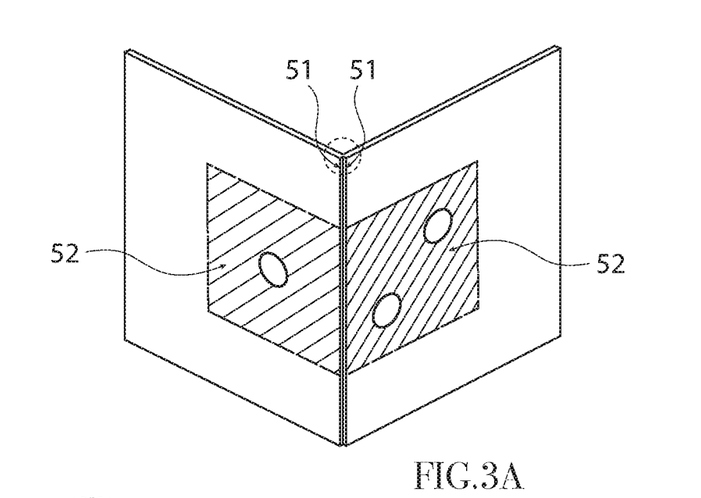
FIGS. 3A and 3B depict the piece of standard animated paper (5) from FIG. 2, whereby it is folded along the fold line (51).
Figure 3B:
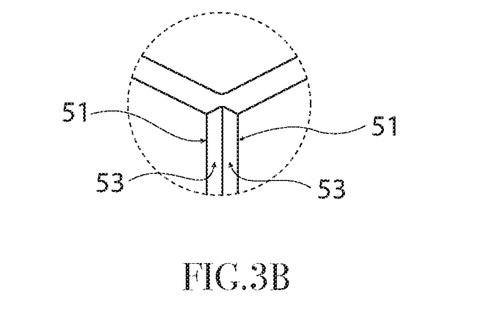

As mentioned, animated paper undergoes a cutting process, at the end of which the paper has fold lines and cut lines. A cut line means that during the creation of the final product from the paper, it is cut along the cut line. Similarly, a fold line means that during the creation of the final product from the paper, it is folded along the fold line. Nowadays, it is customary to create fold and cut lines by means of perforation or by partially cutting the thickness of the paper. The term perforation refers to a known technology whereby a (cut or fold) line is created by making a series of fine pinholes that enable the user to fold or cut the paper in a fast manner. Paper may also be prepared for folding or cutting by cutting it with a very thin, sharp knife so that the cut goes only partially through the thickness of the paper (otherwise the paper will be cut immediately). To describe the problem that the present invention solves, imagine a standard animated paper (5) with a conventional fold line (51) and a print (52) that extends over said fold line, as depicted in FIG. 2. FIG. 3 depicts the standard animated paper (5) from FIG. 2 after it is folded along the fold line (51).

As is evident from the drawing, after the paper (5) is folded along the fold line (51), the inner part of the paper (the thickness of the paper, denoted 53) along the fold line (51) is white (or any other original color of the paper) and as a result, the print (52) on the paper is not continuous. This problem has led manufacturers to print only on areas of animated paper that do not include fold lines. Thus, for instance, U.S. Patent Application No. U.S. 2014/0069994, which refers to animated paper, emphasizes that printing should not be done on the fold lines, but rather only on areas of the paper that do not include such lines.

Furthermore, when the printed design appears on the back side of the paper rather than on the side with the fold line, and the user tries to fold the paper from the other side of the fold line, the paper simply "bursts". The present invention offers a good and effective solution to this problem by providing a method of creating fold lines that enable aesthetic folding of the paper as well as the possibility of printing graphics over the fold lines themselves.

Animated papers are manufactured primarily using offset printing machines and the manufacture process of such products includes, in general, the following components and stages: Stage I: A specific model of the animated paper is selected from a variety of models, or a new model is developed. Stage II: A graphic artist or the client prepares the appropriate graphics for the selected model. Stage III: A special die is manufactured so that the paper may be cut according to the template of the selected model, which indicates the location of the cuts, folds, and perforations, as well as the borders of the printed paper. Stage IV: Paper is purchased to serve as raw material for the manufacture of the product. Stage V: The graphics are printed onto the paper using an offset printing machine. Stage VI: The printed paper is transferred to the cutting machine, which uses the die to cut the paper. Stage VII: The paper is manipulated and folded, and the pieces are joined and pasted to obtain the final product.

Note that all of the Stage VII operations are performed manually (hereinafter "the manual assembly"). Stage VIII: The finished product is delivered to the client. Stage IX: Quality control is performed on each of the aforementioned stages. This stage is performed in parallel and in overlapping with all of the other stages, since each and every stage requires quality control. The quality control performed on each of the stages renders the production of animated papers expensive, since the process includes irregular graphics, printing, and cutting, as well as manual assembly.

The stages described above are relatively complex, complicated and expensive. Thus, for instance, the printing house must verify that the selected graphics are appropriate and accurate since due to the fact that the product is a folded animated paper, some parts of the paper are supposed to face up while should others face down. Cutting must be executed and printing plates must be prepared for the graphics. It is, therefore, customary to execute the printing part of the manufacture process using offset printing. Indeed, the manufacture process of animation papers includes multiple stations, verifications, and preparation of components for manufacture. As a result, it is an expensive process and clients who order relatively few units of a specific model are required to pay a relatively high price per unit.

Thus, a large group of potential users who require only several dozen units of a certain model is excluded from the market. The present invention offers a solution to the problem described above and it refers to a system and process for the manufacture of animated papers using digital printing that is more efficient and less expensive for the client than currently existing systems and methods.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The apparatus for displaying graphics (500), subject matter of the present invention, comprises a permanent base (510) and an inner sliding member (520). The inner sliding member (520) is combined inside the permanent base (510) such that it can slide in and out of the permanent base (510). The apparatus may also include a second inner sliding member (630).

To describe the apparatus (500) in a clearer manner, we will begin with a description and explanation of the structure of the inner sliding member (520) and end with a description and explanation of the structure of the permanent base (510). In addition, we will also explain how each component is inserted and combined with the other.

Figure 9:
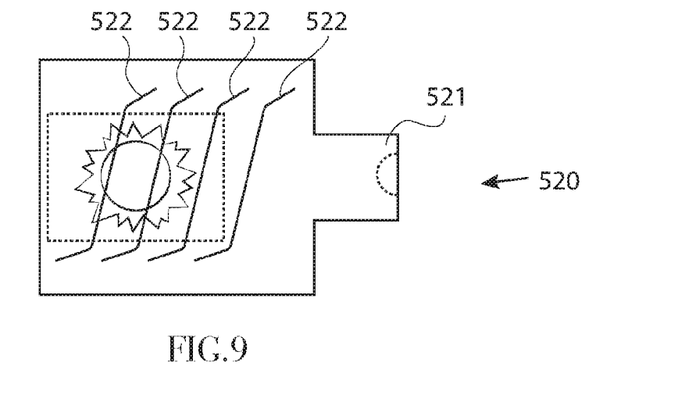
FIG. 9 depicts the inner sliding member (520).

The inner sliding member (520), which is depicted in FIG. 9, is generally designed as a rectangular panel with a side flange (521) and in its center several vertical cuts (522). The inner member (520) includes graphics, and in the accompanied drawings the graphic is in a form of a Sun.

Figure 10:
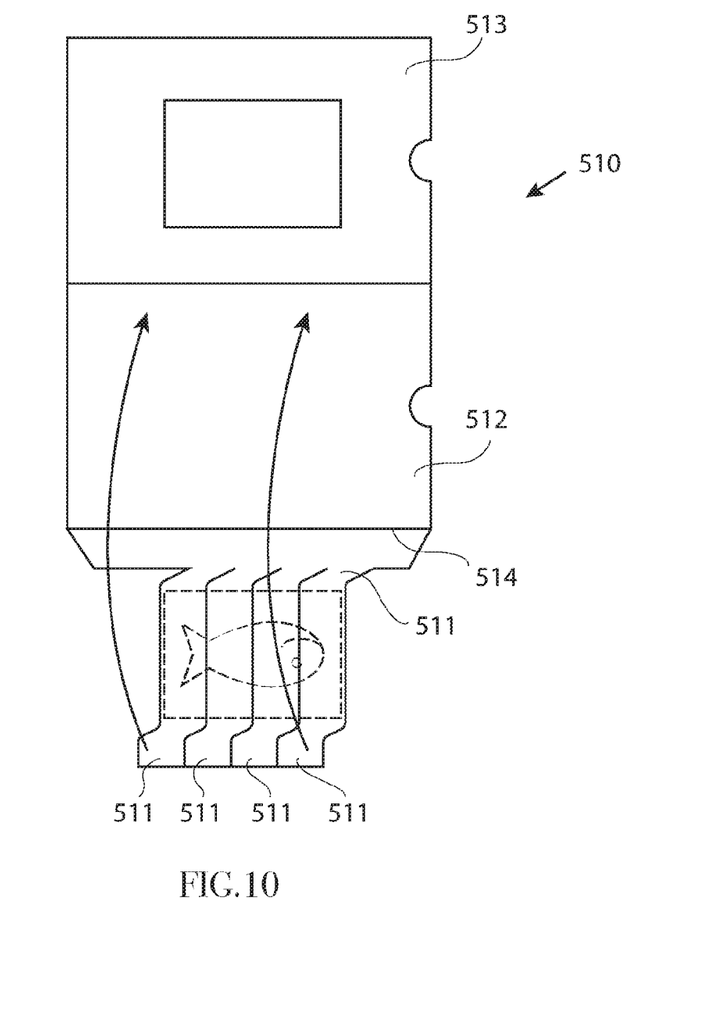
FIG. 10 depicts the permanent base (510) in layout state

The permanent base (510) is described in FIG. 10 in layout state, before folding and pasting. The permanent base (510) includes several vertical flanges (511), back side (512) and a front window frame (513). The number of the vertical flanges (511) corresponds with the number of the vertical cutes (522). The vertical flanges (511) include graphics, and in the accompanied drawings the graphic is in a form of a Fish.

Figure 11:
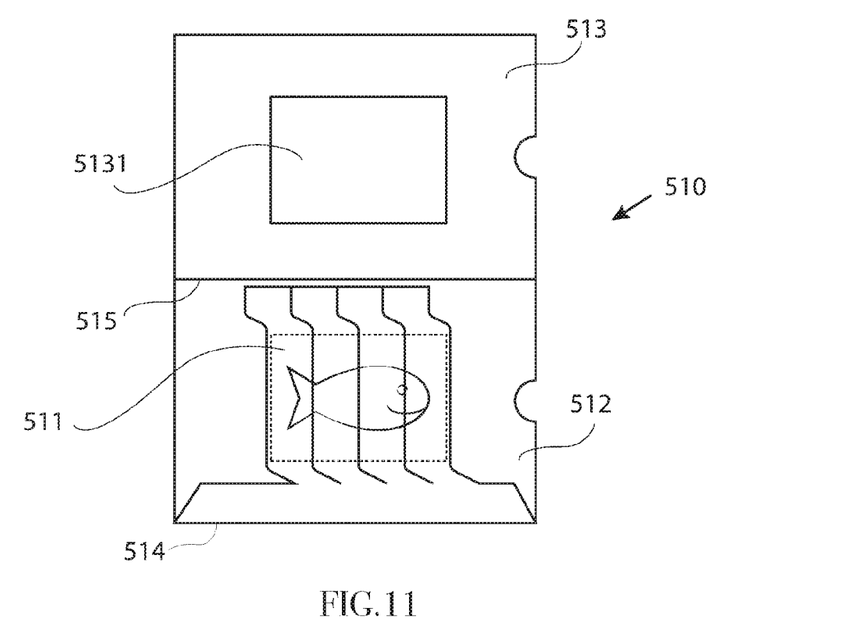
FIG. 11 depicts the permanent base (510).
Figure 12:
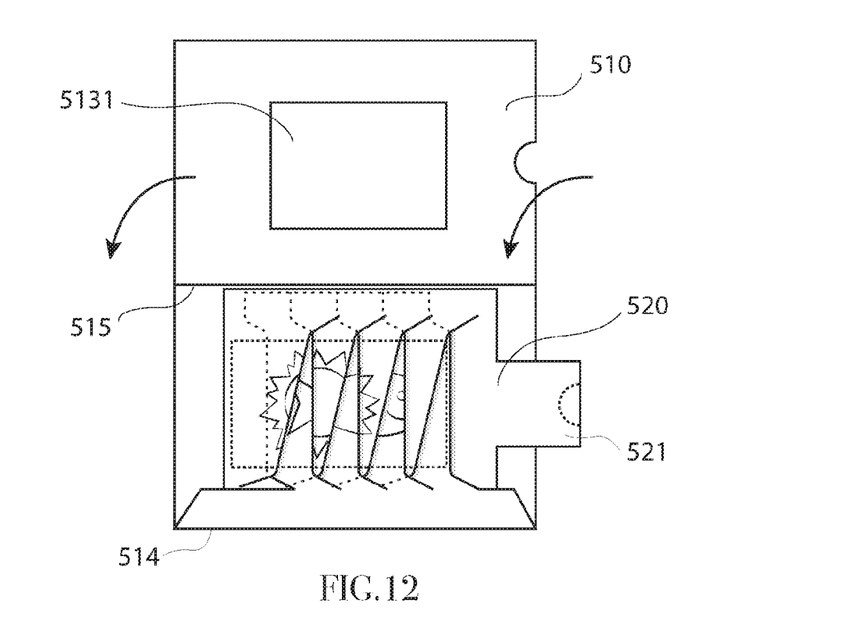
FIG. 12 depicts the permanent base (510) with the inner sliding member (520).
Figure 14:
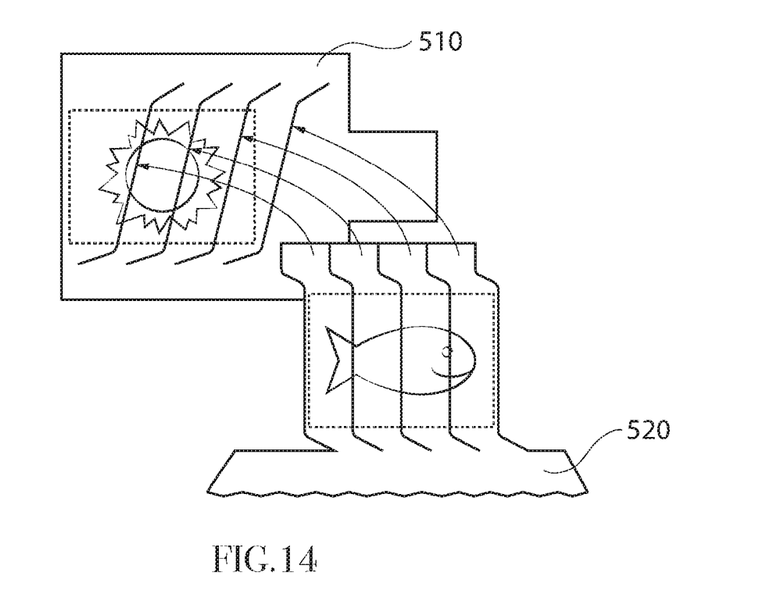
FIGS. 14-17 depict the permanent base (510) with the inner sliding member (520).

Assembling the apparatus (500) and the way it works: first, folding the vertical flanges (511) along the folding line (514) in a way that they positioned on the inner side of the back side (512), as described in FIGS. 11 and 12. After that, positioning the inner sliding member (520) between the vertical flanges (511) and between the back side (512). At this stage, inserting the vertical flanges (511) (of the permanent base 510) in order inside the vertical cutes (522) (of the inner sliding member 520), as demonstrated for example in FIG. 14. At the next step, folding the front window frame (513) along the folding line 515 in a way that it is attached and parallel to the vertical flanges (511) and to the inner sliding member (520) and covers them, though the graphics that on them are visible through the window (5131) of the front window frame (513).

Figure 13A:
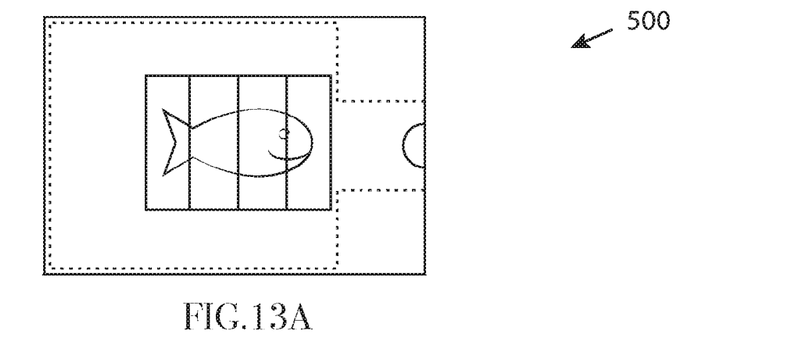
FIGS. 13A and 13B depict the apparatus (500).

FIG. 13A depicts the apparatus (500) in a closed position, means, in a way that the inner sliding member (520) is fully inside the permanent base (510) (hereinafter "closed position"). When the apparatus (500) is in a closed position, then the graphics on the permanent base (510) is visible through the window (5131), and in the drawings the graphic is in a form of a Fish.

Figure 13B:
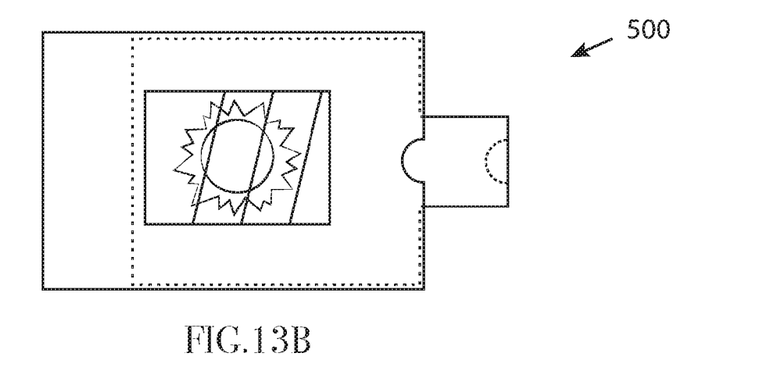

FIG. 13B depicts the apparatus (500) in an opened position, means, in a way that the inner sliding member (520) is protrude out of the permanent base (510) (hereinafter "opened position"). When the apparatus (500) is in an opened position, then the graphics on the inner sliding member (520) is visible through the window (5131), and in the drawings the graphic is in a form of a Sun.

Figure 15:
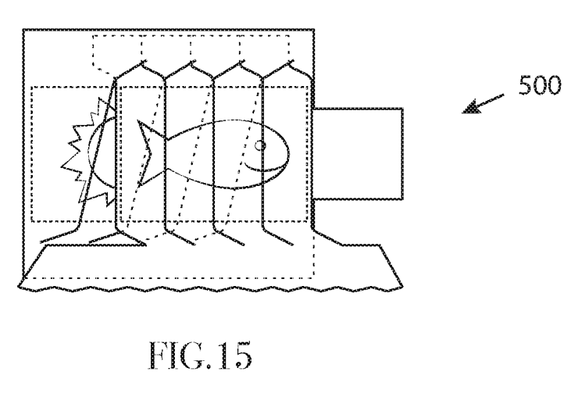
Figure 16:
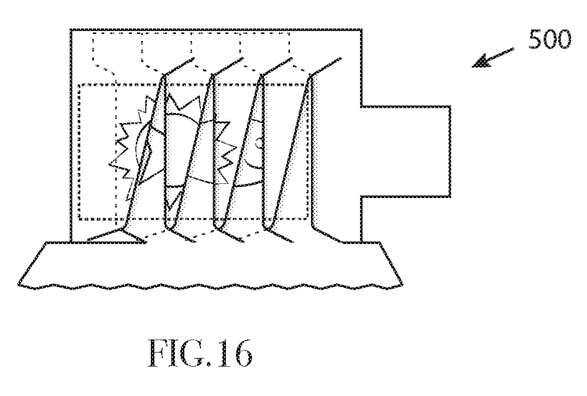
Figure 17:
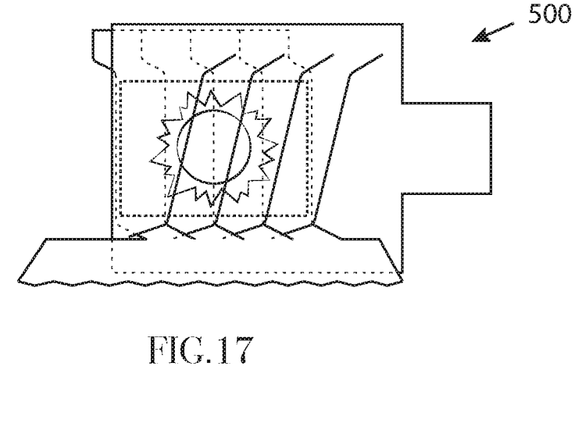

FIG. 15 until 17 depict the way that the inner sliding member (520) moves relatively to the permanent base (520). When the vertical flanges (511) are combined and inserted through the vertical cutes (522), then the inner sliding member (520) can move horizontally relative to the permanent base (510). This movement stopped and limited when the diagonal bottoms of the vertical flanges (511) are blocked by the diagonal bottoms of the vertical cutes (522).

The apparatus for displaying graphics (600) is an advanced apparatus, that is basically similar to said apparatus numbered as 500, and it comprises a permanent base (610), an inner sliding member (620), which is combined inside the permanent base (610) and further includes a Second inner sliding member (630).

Figure 18:
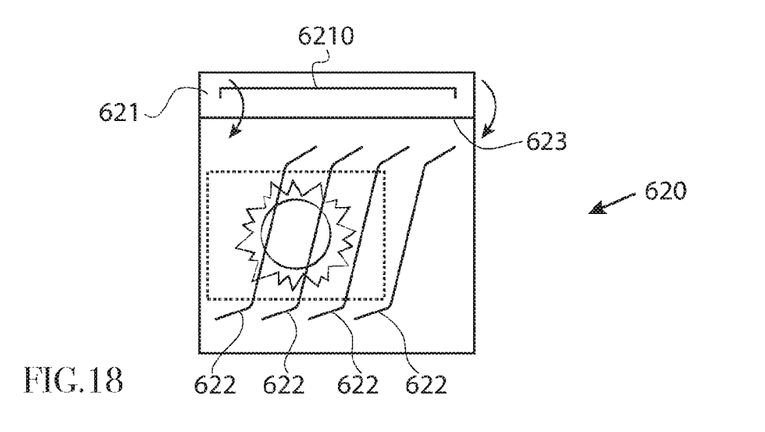
FIG. 18 depicts the inner sliding member (620).

The inner sliding member (620), which is depicted in FIG. 18, is generally designed as a rectangular panel with several vertical cuts (622) in its center. The inner sliding member (620) includes an upper flange (621) with a horizontal cut (6210). The inner sliding member (620) includes graphics.

Figure 20:
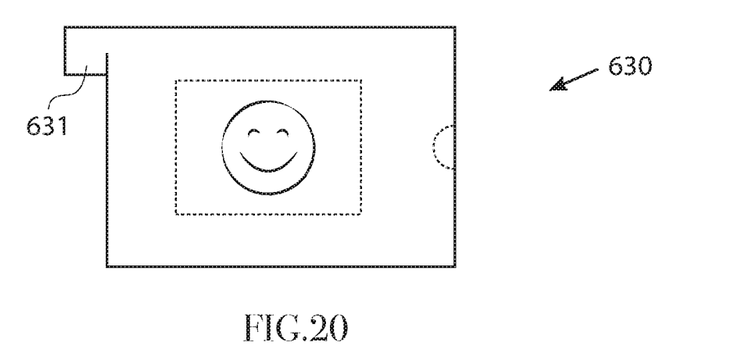
FIG. 20 depicts the second inner sliding member (630).

The Second inner sliding member (630), is described in FIG. 20, is generally designed as a rectangular panel with an upper side protrusion (631) and this part also can includes graphics, and in the accompanied drawings the graphic is in a form of a Smile.

Figure 19:
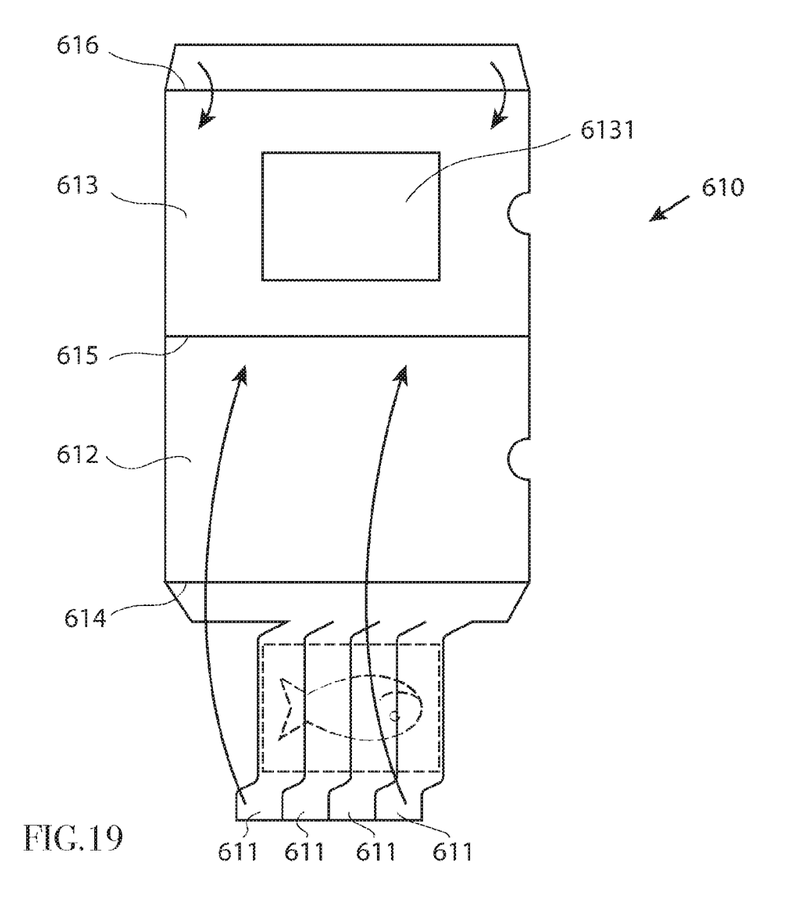
FIG. 19 depicts the permanent base (610) in layout state

The permanent base (610) is described in FIG. 19 in layout state, before folding and pasting. The permanent base (610) includes several vertical flanges (611), back side (612) and a front window frame (613). The number of the vertical flanges (611) corresponds with the number of the vertical cutes (622). The vertical flanges (611) include graphics.

Figure 21:
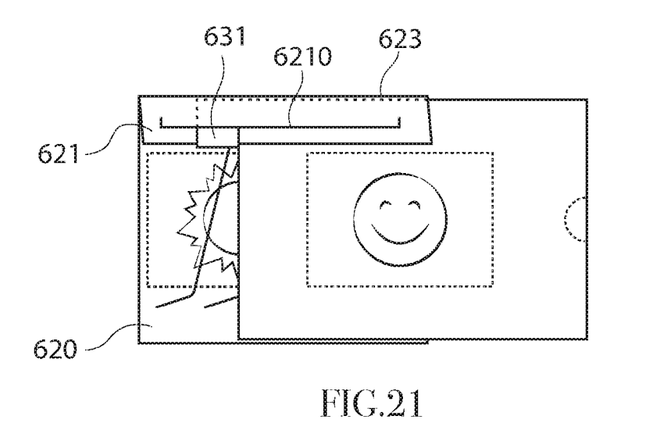
FIGS. 21-22 depict the inner sliding members (620) and (630).
Figure 22:
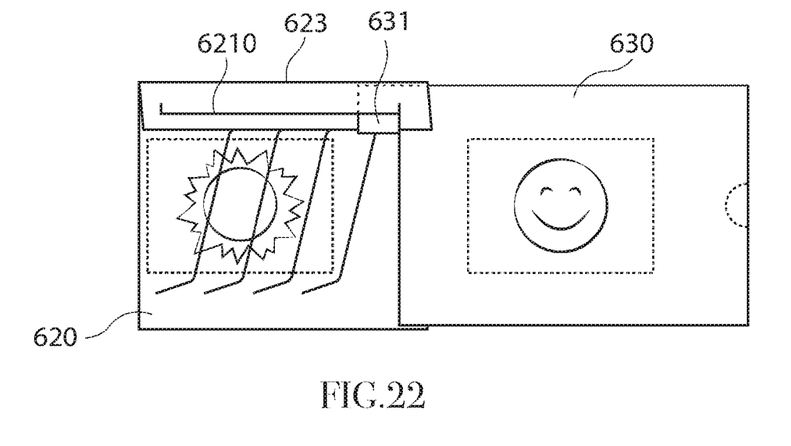

Assembling the apparatus (600) and the way it works are very similar to the above-mentioned apparatus 500, and therefore we will stress mainly the different aspects. Folding the upper flange (621) along the folding line (623) of the inner sliding member (620) and inserting into the horizontal cut (6210) the upper side protrusion (631) of the second inner sliding member (630), in a way that is demonstrated in FIGS. 21 and 22. In that way, the second inner sliding member (630) is attached and parallel to the inner sliding member (620) and can move relatively to it, as described for example in FIG. 21. When the second inner sliding member (630) is in a closed position then the upper side protrusion (631) is stopped at the left edge of the horizontal cut 6210 and in an opened position it stopped at the right edge of the horizontal cut 6210, as described in FIG. 22.

Figure 23:
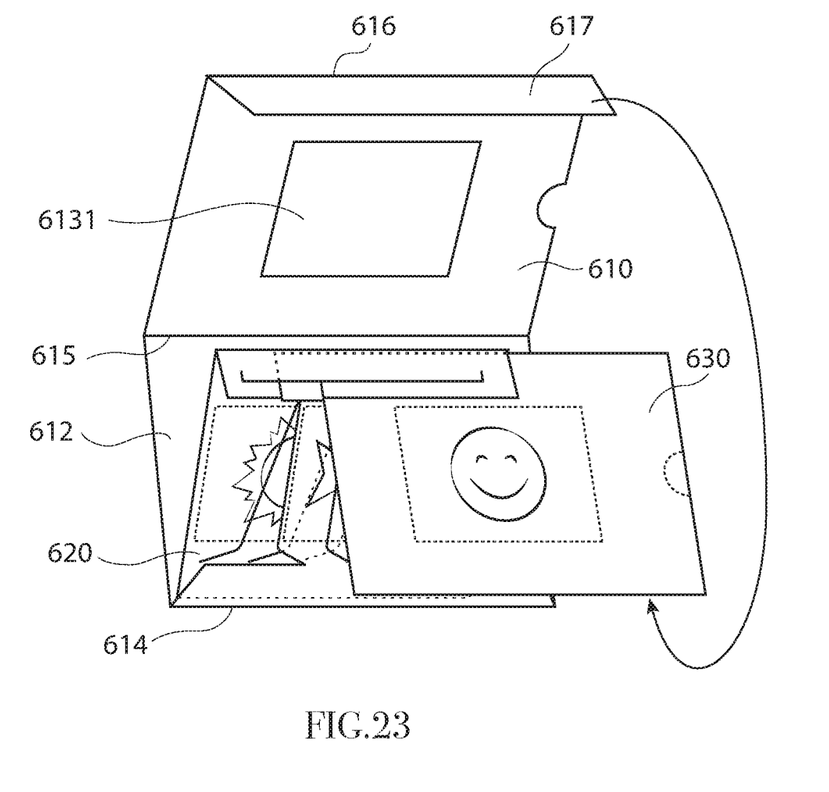
FIGS. 23-26 depict the apparatus (600).

At the next step, folding the vertical flanges (611) along the folding line (614) of the permanent base (610) as described in FIG. 19. After that, combining the inner sliding members (620) and (630) in the permanent base (610) by positioning the inner sliding member (620) between the vertical flanges (611) and between the back side (612), and positioning the second inner sliding member (630) on the vertical flanges (611), as demonstrated in FIG. 23. At this stage, inserting the vertical flanges (611) in order inside the vertical cutes (622). At the next step, folding the front window frame (613) along the folding line 615 in a way that it is attached and parallel to the vertical flanges (611) and to the inner sliding member (620) and covers them, though the graphics that on them are visible through the window (6131) of the front window frame (6513). After that, folding the closing flange (617) along the folding line 616 in a way that it is attached onto the rear side of the back side (612).

Figure 24:
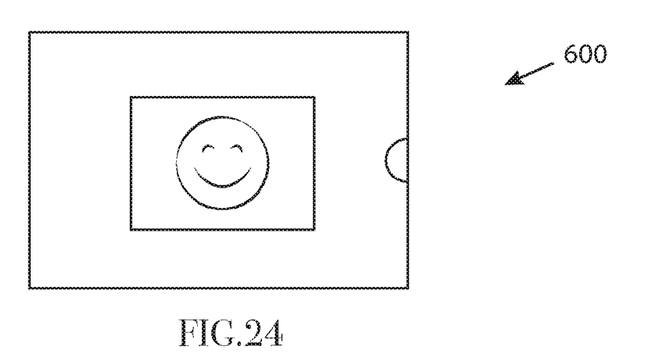
Figure 25:
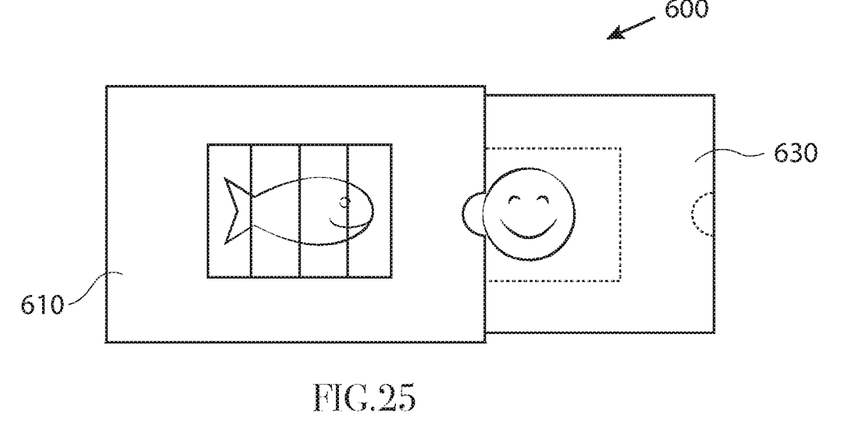
Figure 26:
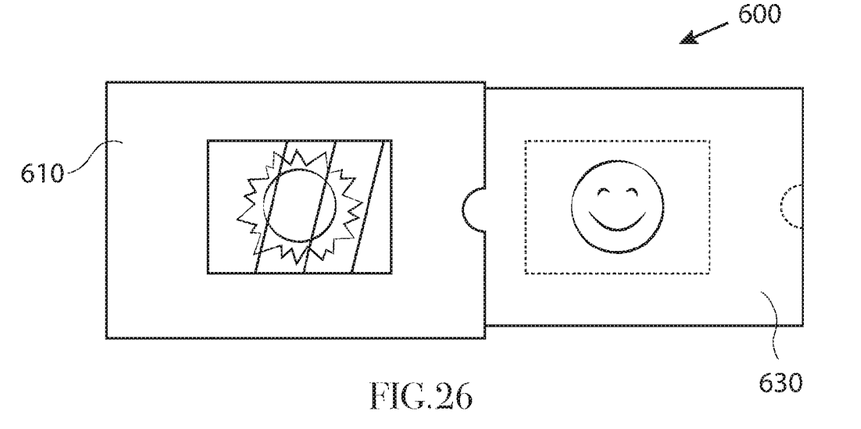

FIG. 24 describes the apparatus (600) in a closed position; FIG. 25 describes the apparatus (600) in an opened position in part; and FIG. 26 describes the apparatus (600) in an opened position.

The main objective of the present invention is to describe a method for creating fold lines (300) that consist of two, or more, parallel fold grooves (301). Another objective of the present invention is to provide innovative animated paper (100) with one, or more, fold lines (300), wherein each fold line (300) consists, as mentioned above, of two, or more, parallel fold grooves (301).

Another objective of the present intention is to provide a system and process for the manufacture of innovative animated papers (100) using digital printing in a more efficient and less expensive way than is currently available and customary.

The system and process (1) for the manufacture of animated papers (100), subject of the present invention, are based on the following components and stages:

Component I:

Software (2) that offers a computerized presentation of a selection of models of animated papers (100). Among other things, the software enables the user: (a) to choose a specific model from a selection of models offered by the software; (b) to design the graphics for the selected product; (c) to preview the selected product with the selected graphics; and (d) to send said graphic design as a ready-for-print file (for digital printing). The software (2) may be installed on an internet site, and in fact to be a website, so as to facilitate user access.

Component II:

Preparation of pre-cut paper (3) for the models offered by the software (2). The cutting method used to pre-cut paper enables the paper to later undergo printing in a digital printing machine without the risk of pieces of paper falling off during printing. In other words, the paper (3) can undergo printing like any other regular paper. In addition, said cutting enables subsequent high-quality printing on the paper (3). After the paper undergoes digital printing, the cut pieces of paper (3) may be removed according to the cuts and perforations and the paper may be prepared for folding, assembly, and gluing. The printer, e.g. the digital printing house, can maintain a stock of pre-cut papers (3) for the models offered by the software (2) or the entity operating the system and process (1), subject of the present invention, can prepare pre-cut papers (3) for the variety of models offered by the software (2) and supply them to printers, such as digital printing houses. Thus, digital printing houses can offer pre-cut paper (3) for a variety of models, as mentioned, without having to maintain and operate cutting, perforating, or offset printing machines.

Component III:

The printer receives a ready-for-print file from the software (2) that is prepared by the client him/herself or by a graphic designer on of the client. Alternatively, the printer may prepare the ready-for-print file on behalf of the client directly. The client may also use the software to send the printing house a detailed order for the job as well as payment. The printing house prints said file on the pre-cut paper (3) for the selected model. Pre-cut paper (3) that has undergone printing will be referred to as the "printed paper".

Component IV:

The printing house may execute the manual assembly of the ordered product itself or send the printed paper (4) directly to the client, who can then perform the manual assembly him/herself. Assembly instructions may be attached to said shipment or they may be displayed in the software (2).

Implementation of the system and process (1), subject of the present invention, enables the general public to order small amounts of animated paper products (100) at a reasonable and affordable price. This was not previous possible using standard systems and processes currently known and available. In addition, implementation of the system and process (1) as mentioned enables digital printing houses to offer clients this service independently as a quick, off-the-shelf service. Printing houses that offer said service are not required to maintain machines and means for cutting and perforating the paper, nor must they have knowledge about the execution of such tasks; all they need is a supply of ready-to-use paper (3) for the models offered by the software (2). Then, they have only to print the graphics they receive from the software on the relevant paper and send it to the client, before or after executing the manual process (folding and gluing), as explained above.

The system and process (1) enable to manufacture animated paper products (100) using digital printing instead of offset printing as is currently required in standard manufacturing processes. Using digital printing significantly reduces the cost of the manufacture process. Offset printing requires the preparation of graphic plates, making the process more expensive; digital printing, on the other hand, enables to print a small number of units at a very low cost. Currently known methods and processes for the manufacture of animated papers also require the printer to maintain and operate cutting and die machines, a requirement that is not relevant when it comes to digital printing. The method and process (1), subject of the present invention, enable digital printing houses to manufacture animated paper products (100) without having to maintain and operate cutting machines. Implementing the system and process (1), subject of the present invention, enables standard digital printing houses to produce animated paper products (100) for their clients, a service they were not able to offer previously.

Figure 1:
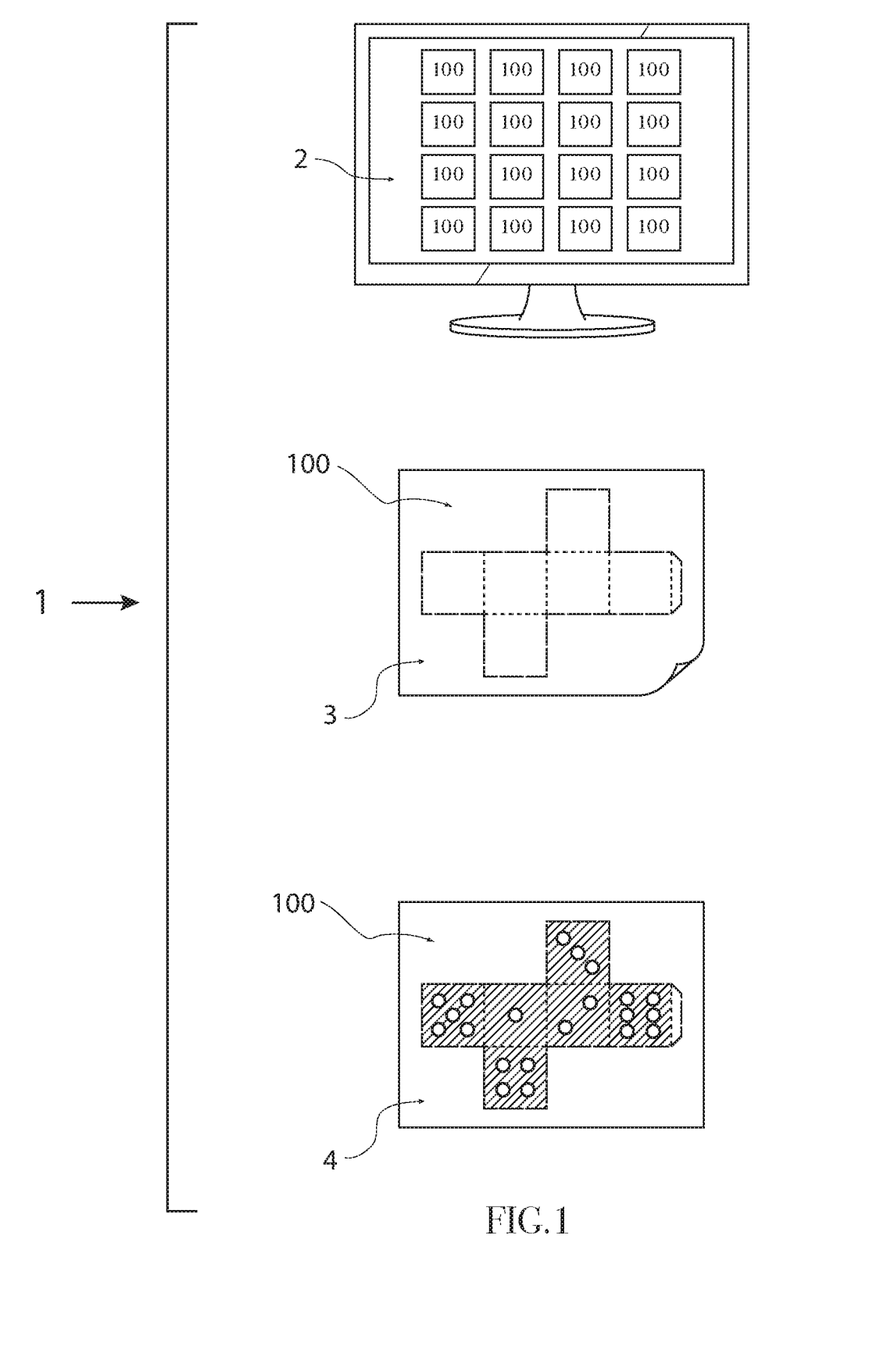
FIG. 1 presents a schematic description of the system and process (1) that include software (2) that offers a selection of models of innovative animated paper products (100), pre-cut sheets of paper (3), and printed paper (4).

FIG. 1 presents a schematic description of the system and process (1) that include software (2) that offers a selection of models of animated paper products (100), pre-cut sheets of paper (3), and printed paper (4) that is to be folded and glued so as to yield the selected model.

The main objective of the present invention is, as mentioned, to provide innovative animated paper (100) with one, or more, fold lines (300), whereby each fold line (300) consists, as mentioned above, of two, or more, parallel fold grooves (301). Fold grooves may be created by laser "cutting". They are created on the side of the paper (100) that is not designated for printing. The paper (100) is folded toward the side with the fold grooves (301).

Figure 4A:
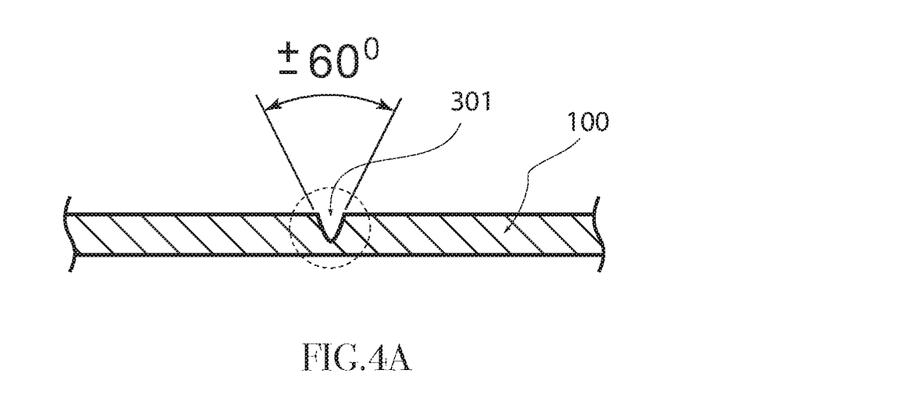
FIG. 4A presents a schematic cross section of a piece of innovative animation paper (100) with a fold groove (301).
Figure 4B:
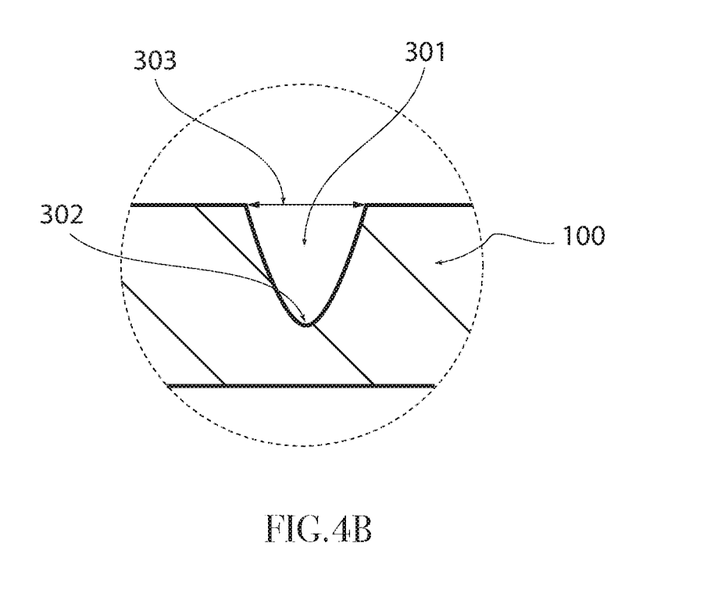
FIG. 4B presents a schematic cross section of a piece of innovative animation paper (200) with a fold groove (301) that has a bottom (302) and an upper opening (303).

The deep, inner part (302) of the fold groove (301), which in fact constitutes the bottom of the fold groove, is narrow and may be v-shaped. The top part (303) of the fold groove (301), which in fact constitutes the opening of the fold groove, is wider than its bottom. The depth of the fold groove (301) should be about 50% of the thickness of the paper (100) and the width of the upper part (303) of the fold groove (301) should be about 50% of the thickness of the paper (100). For example, if the paper (100) is 0.4 mm thick, the depth of the fold groove (301) as well as the width of the upper part (303) of the fold groove should both be 0.2 mm.

fold grooves (301) enable the user to bend the paper at an angle of 60°, more or less, without affecting the aesthetics of the paper on the other side, i.e. on the front (visible) side on which the graphics are printed. When a fold line (300) consists of two parallel and close fold grooves (301A) (301B), the paper may be bent, and in fact folded, as an angle of 120°, more or less. A fold line (300) that consists of three such parallel fold grooves (301A) (301B) (301C) enables the paper (100) to be folded at an angle of 180°. The distance between two adjacent fold grooves (301) should be around 0.2 mm, in accordance with the above measurements.

The distance between two adjacent fold grooves (301) determines the overall thickness of the fold. The overall thickness of the fold increases or decreases according to the distance between the fold grooves (301) that make up the fold line (300). The more fold grooves (301) there are in the fold line (300), the more aesthetic, rounded, and flexible the fold will be.

Figure 5:
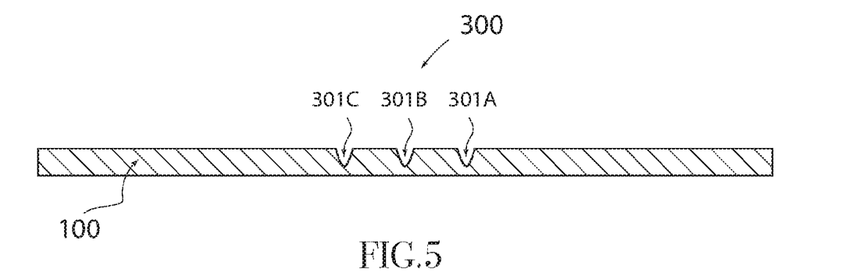
FIG. 5 presents a schematic cross section of a piece of unfolded innovative animation paper (100) with a fold line (300) that consists of three fold grooves (300A) (300B) (300C).
Figure 6:
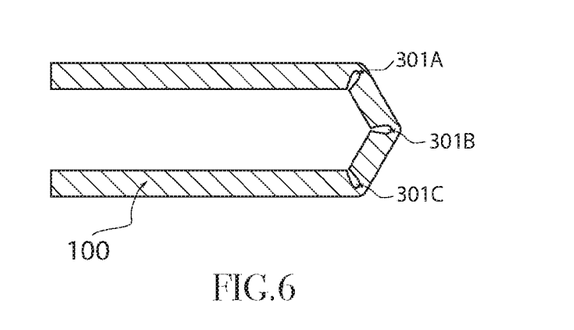
FIG. 6 presents a schematic cross section of a piece of innovative animation paper (100) with a fold line (300) that consists of three fold grooves (300A, 300B, 300C) and is folded to achieve a 180° fold.
Figure 7:
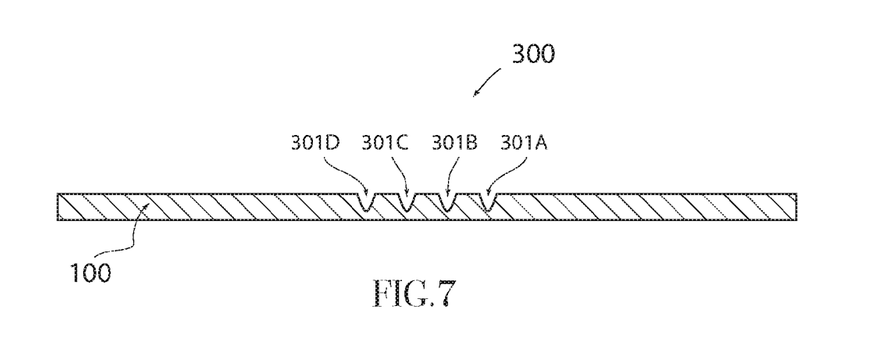
FIG. 7 presents a schematic cross section of a piece of unfolded innovative animation paper (100) with a fold line (300) that consists of four fold grooves (300A) (300B) (300C) (300D).
Figure 8:
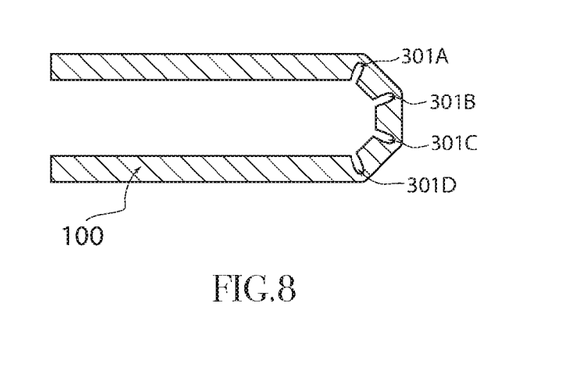
FIG. 8 presents a schematic cross section of a piece of innovative animation paper (100) with a fold line (300) that consists of four fold grooves (300A) (300B) (300C) (300D) and is folded to achieve a 180° fold.

FIG. 4 presents a schematic cross section of a piece of innovative animation paper (100) with a fold groove (301) whose groove walls are as a 60° angle. FIG. 5 presents a schematic cross section of a piece of unfolded innovative animation paper (100) with a fold line (300) that consists of three fold grooves (300A) (300B) (300C). FIG. 6 presents a schematic cross section of a piece of innovative animation paper (100) with three fold grooves (300A) (300B) (300C) that is folded to achieve a 180° fold. FIG. 7 presents a schematic cross section of a piece of unfolded innovative animation paper (100) with four fold grooves (300A) (300B) (300C) (300D). FIG. 8 presents a schematic cross section of a piece of innovative animation paper (100) with four fold grooves (300A) (300B) (300C) (300D) that is folded to achieve a 180° fold. FIG. 9 presents a schematic cross section of a piece of innovative animation paper (200) with a fold groove (301) that has a bottom (302) and an upper opening (303).

What is claimed is:

1. A method for displaying graphics (600), comprises:
providing a permanent base (610), a first inner sliding member (620), and a second inner sliding member (630);
wherein said first inner sliding member (620) is designed as a rectangular panel with a plurality of vertical cuts (622) in its center; wherein said first inner sliding member (620) includes an upper flange (621) with a horizontal cut (6210); wherein said first inner sliding member (620) includes graphics;
wherein said second inner sliding member (630) is designed as a rectangular panel with an upper side protrusion (631); wherein said second inner sliding member (630) includes graphics;
wherein said permanent base (610) includes a plurality of vertical flanges (611), back side (612) and a front window frame (613); wherein the number of said vertical flanges (611) corresponds with the number of said vertical cutes (622); wherein said vertical flanges (611) include graphics;
the method for displaying graphics comprising assembling said permanent base (610), said first inner sliding member (620), and said second inner sliding member (630) together according to the following steps:
(a) folding said upper flange (621) along a folding line (623) of said first inner sliding member (620) and inserting into said horizontal cut (6210) said upper side protrusion (631) of said second inner sliding member (630);
whereby said second inner sliding member (630) is attached and parallel to said first inner sliding member (620) and can move relatively to it;
(b) whereby when said second inner sliding member (630) is in a closed position said upper side protrusion (631) is stopped at a left edge of said horizontal cut (6210) and when said second inner sliding member (630) is in an opened position said upper side protrusion (631) is stopped at the right edge of said horizontal cut (6210);
(c) folding said vertical flanges (611) along a folding line (614) of said permanent base (610);
(d) combining said first inner sliding members (620) and said second sliding member (630) in said permanent base (610) by positioning said first inner sliding member (620) between said vertical flanges (611) and between said back side (612), and positioning said second inner sliding member (630) on said vertical flanges (611); wherein inserting said vertical flanges (611) in order inside said vertical cutes (622);
(e) folding said front window frame (613) along a folding line 615 (615) in a way that it is attached and parallel to said vertical flanges (611) and to said first inner sliding member (620) and covers them; whereby said graphics on said first inner sliding member (620), on said second inner sliding member (630) and on said vertical flanges (611) can be are visible through a window (6131) on said front window frame (613) (6513);

(f) folding a closing flange (617) along a folding line (616) in a way that it is attached onto the rear side of said back side (612).

\* \* \* \* \*